United States Patent
Shanmugam et al.

(10) Patent No.: US 8,286,074 B2
(45) Date of Patent: Oct. 9, 2012

(54) XML STREAMING PARSING WITH DOM INSTANCES

(75) Inventors: Dhandapani Shanmugam, Bangalore (IN); Michael Gilfix, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 12/241,754

(22) Filed: Sep. 30, 2008

(65) Prior Publication Data

US 2010/0083099 A1 Apr. 1, 2010

(51) Int. Cl.
  *G06F 17/00* (2006.01)
  *G06F 17/27* (2006.01)
  *G06F 17/30* (2006.01)

(52) U.S. Cl. ........ 715/234; 715/272; 715/277; 707/736; 707/755; 707/763

(58) Field of Classification Search .................. 715/234, 715/272, 277; 707/736, 755, 763
See application file for complete search history.

(56) References Cited

U.S. PATENT DOCUMENTS

| | | | |
|---|---|---|---|
| 6,671,853 B1 | 12/2003 | Burkett et al. | 715/513 |
| 7,523,119 B2 * | 4/2009 | Imamura et al. | 1/1 |
| 7,653,636 B2 * | 1/2010 | Calahan | 707/999.1 |
| 7,680,782 B2 * | 3/2010 | Chen et al. | 707/999.004 |
| 2004/0010752 A1 * | 1/2004 | Chan et al. | 715/513 |
| 2005/0203957 A1 * | 9/2005 | Wang et al. | 707/104.1 |
| 2007/0022105 A1 * | 1/2007 | Roux | 707/4 |
| 2007/0150504 A1 * | 6/2007 | Ahmed et al. | 707/102 |
| 2007/0250471 A1 * | 10/2007 | Fontoura et al. | 707/2 |
| 2008/0114803 A1 * | 5/2008 | Chinchwadkar et al. | 707/102 |
| 2008/0215559 A1 * | 9/2008 | Fontoura et al. | 707/4 |
| 2009/0006447 A1 * | 1/2009 | Balmin et al. | 707/102 |
| 2009/0043806 A1 * | 2/2009 | Han et al. | 707/102 |
| 2009/0125495 A1 * | 5/2009 | Zhang et al. | 707/4 |

* cited by examiner

*Primary Examiner* — Chau Nguyen
(74) *Attorney, Agent, or Firm* — Yudell Isidore Ng Russell PLLC

(57) ABSTRACT

An apparatus, method, and program product are provided for parsing a document. A match point tuple is passed to a parser instance. The match point tuple comprises a match point. The parser instance stream parses an XML stream. In response to a match point statement in the XML stream matching the match point expression in the match point tuple, the parser instance constructs a DOM instance comprising XML content matching the match point. In a sample embodiment, the match point tuple further comprises a filter, and the parser instance adds XML statements that pass the filter to the DOM instance and discards statements that do not pass the filter.

21 Claims, 3 Drawing Sheets

```
EXAMPLE XML:                                              300

<EMPLOYEES>
<EMPLOYEE>  ─ 310
        <NAME>DHANDU</NAME> ─ 311
        <EID>846757</EID> ─ 312
        <ADDRESS> ─ 313
                <LOC>BLOCK A</LOC> ─ 314
                <STR>STR 1</STR> ─ 315
                <PHONE> ─ 316
                        <DIRECT-OFFICE>113</DIRECT-OFFICE> ─ 317
                        <RESI>456</RESI> ─ 318
                        <MOBILE>999</MOBILE> ─ 319
                </PHONE> ─ 316A
        </ADDRESS> ─ 313A
</EMPLOYEE> ─ 310A
<EMPLOYEE> ─ 320
        <NAME>MIKE</NAME> ─ 321
        <EID>12345</EID> ─ 322
        <ADDRESS> ─ 323
                <LOC>BLOCK B</LOC> ─ 324
                <STR>STR 2</STR> ─ 325
                <PHONE> ─ 326
                        <DIRECT-OFFICE>111</DIRECT-OFFICE> ─ 327
                        <RESI>222</RESI> ─ 328
                        <MOBILE>333</MOBILE> ─ 329
                </PHONE> ─ 326A
        </ADDRESS> ─ 323A
</EMPLOYEE> ─ 320A
</EMPLOYEES>
```

FIG. 3

```
DOM 1:                       400
<phone> ─ 411
<resi>456</resi> ─ 412
</phone>
```

FIG. 4

```
DOM 2:                       500
<phone>
<resi>222</resi>
</phone>
```

FIG. 5

XML STREAMING PARSING WITH DOM INSTANCES

FIELD OF THE INVENTION

The invention relates to the field of data processing and more particularly to a method, apparatus and program product for XML stream parsing with DOM instances.

BACKGROUND

In general, there are two programming models of parsers for working with XML infosets: document streaming (sometimes referred to as stream or stream-based parsing) and document object model (DOM). The DOM model involves creating in-memory objects representing the entire document tree and the complete infoset state for an XML document. In the DOM model, the entire XML document is stored in memory before processing. Once in memory, DOM trees can be navigated freely, traversed in any direction, and parsed arbitrarily. Moreover, comments are preserved. Thus, the DOM model provides maximum flexibility for developers. Also, nodes can be inserted or deleted in the DOM model. However, the cost of this flexibility is a potentially large memory footprint and significant processor requirements. This is due to need to hold the entire representation of the document in memory as objects for the duration of the document processing. In the DOM model, memory and processor requirements escalate quickly with increasing document size.

Document streaming refers to a program model in which XML infosets are transmitted and parsed serially at application runtime, often in real time, and often from dynamic sources whose contents are not precisely known beforehand. Stream-based parsers can start generating output immediately, and infoset elements can be discarded and garbage collected immediately after they are used. This allows stream-based parsers to have a smaller memory footprint and reduced processor requirements as compared to DOM model parsers. However, with stream-based parsers, a developer can only see the infoset state at one location in the document at a time. The developer is limited to what is sometimes referred to as the "cardboard tube" view of a document, referring to the view being limited to a portion of the document. The implication is that the developer needs to know what processing he/she wants to do before reading the XML document. Moreover, comments are not preserved and the document can only be traversed from top to bottom.

Many software developers are very comfortable with DOM Application Program Interface (API), and prefer the ability to navigate in different directions as their applications process the DOM tree. Also, in a DOM-based parsing, a developer can use multiple XPath expressions to extract data from the DOM without parsing the entire document each time. However, as documents get large, creating the entire DOM tree for a given document becomes unwieldy due to memory and processor requirements. Moreover, many applications may only be interested in specific segments of the document, rather than the document as a whole. The DOM model, however, requires the entire tree to be parsed and stored in memory, resulting in memory and processing time being expended to parse unwanted portions of the document.

In stream based parsing, the parsing model may be pull parsing, in which an application calls methods on an XML parsing library when it needs to interact with an XML infoset—that is, the client only gets (pulls) XML data when it explicitly asks for it. Alternatively, the parsing model may be push parsing, in which an XML parser sends (pushes) XML data to the application as the parser encounters elements in an XML infoset—that is, the parser sends the data whether or not the application is ready to use it at that time.

SUMMARY

An apparatus, method, and program product are provided for parsing a document. A match point tuple is passed to a parser instance. The match point tuple comprises a match point, which is an identification or expression of a part of an XML stream to build a DOM with. The parser instance stream parses an XML stream. In response to a match point statement in the XML stream matching the match point in the match point tuple, the parser instance constructs a DOM instance comprising XML content matching the match point tuple. The parser instance then provides the newly constructed DOM instance to an application or program of instruction. The DOM instance may be pushed by the parser or pulled by the application.

In a sample embodiment, the match point tuple further comprises a set of filter statements, and the parser instance only adds XML statements to the DOM instance that pass the filter. The parser instance filters the XML data using the filter in the match point tuple. Data that matches the attributes identified in the filter statements is collected, while data that does not meet the filter statements is discarded.

In a sample embodiment a program of instructions constructs a parser instance that is configured to stream parse an XML stream and to construct a DOM instance comprising XML content matching a match point and any filters. The program of instructions passes a match point tuple to the parser instance. The match point tuple comprises a match point, and it may also include a filter. The parser then locates nodes in an XML stream that match the match point and capture the XML data in those nodes that pass any filters in the match point tuple. The program of instructions then receives the DOM instance comprising XML content under the match point.

According to another exemplary embodiment, an apparatus for parsing a document is provided. The apparatus comprises a processor and a memory interconnected with the processor. The memory has a parser instance stored thereon. The parser instance is executable by the processor to: receive a match point; read an XML stream; in response to a statement in said XML stream matching said match point, construct a DOM instance; and in response to an end statement matching said match point signaling an application with said DOM instance.

According to another exemplary embodiment, a program product is provided. The program product comprises a computer readable media having stored thereon computer executable instructions. The program product includes instructions for constructing a parser instance. The parsing instance is configured to stream parse an XML stream and to construct a DOM instance comprising XML content matching a match point. Additional instructions pass a match point tuple to the parser instance. The match point tuple includes a match point which may be in the form of an XPath expression, and may further include a filter comprising one or more data attributes. Additional instructions receive the DOM instance comprising XML content under the match point and passing any filter.

BRIEF DESCRIPTION OF THE DRAWINGS

The features and advantages of the invention will be more clearly understood from the following detailed description of the preferred embodiments when read in connection with the accompanying drawing. Included in the drawing are the following figures:

FIG. 3 is a schematic view of an exemplary XML document; and

FIGS. 4 and 5 are schematic views of DOM instances constructed from the XML document of FIG. 4 using a parsing instance according to A sample embodiment of the present invention.

DETAILED DESCRIPTION

The present invention provides a method, apparatus and program product for stream-based parsing of XML content with DOM instances according to a sample embodiment of the present invention.

Figure 1:
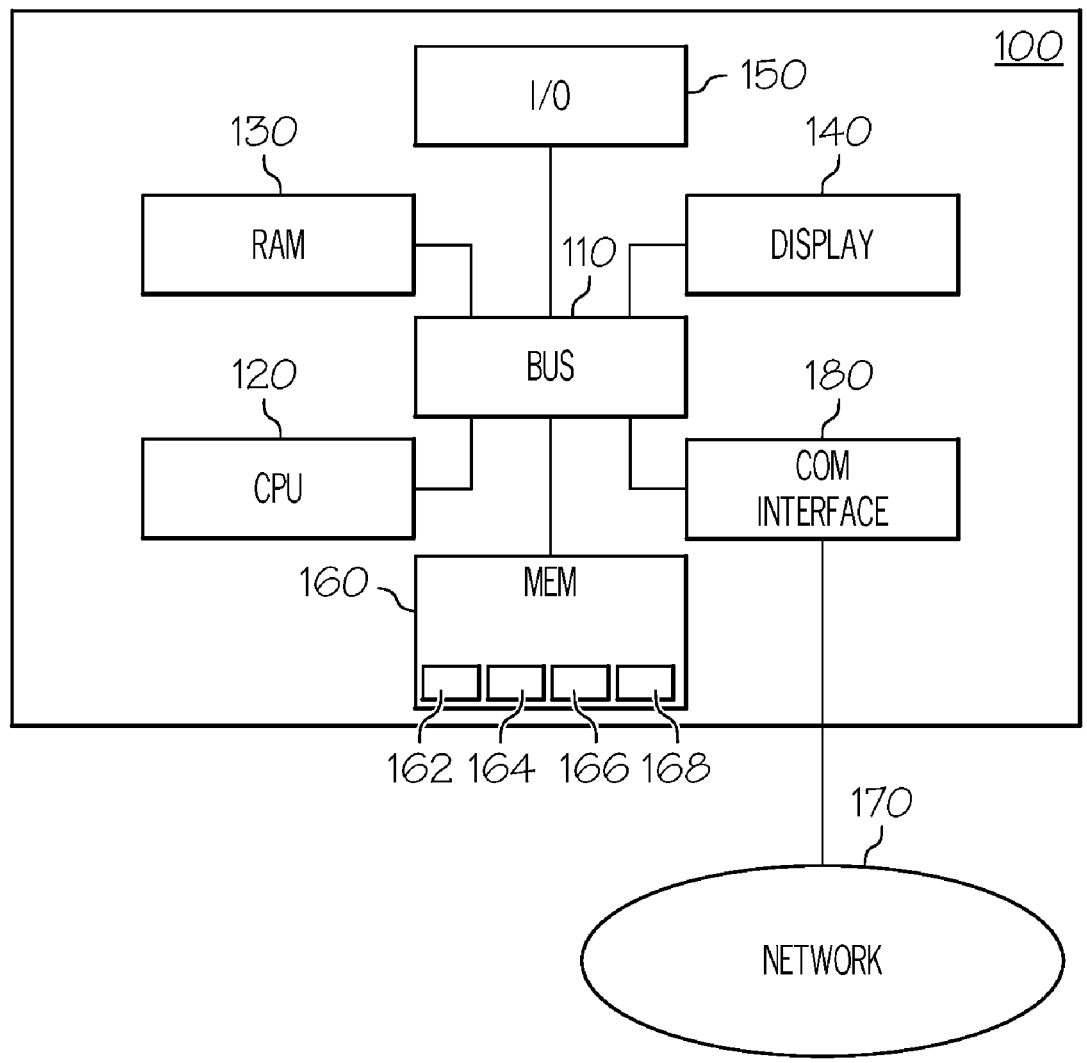
FIG. 1 is a block diagram of an apparatus for stream-based parsing of XML content with DOM instances according to a sample embodiment of the present invention.

In a sample embodiment, as shown in FIG. 1, a computer 100 comprises a bus 110 interconnected with a processor 120, a random access memory 130, and a memory 160. A display 140 for providing a graphic user interface and one or more input/output devices 150 such as a mouse, a keyboard, and the like may also be interconnected to the bus 110. Bus 110 may further be interconnected to a network 170, such as the Internet, an intranet, or the like through a communication interface 180.

The computer 100 may be any digital computing device, such as a personal computer (PC), a mobile digital device, or the like. Alternatively, the computer 100 may be a server or the like serving a network. The memory 130 may comprise one or more permanent or removable memory devices, such as a hard drive, a CD drive, a flash drive, an external drive, or the like. Communication interface may be any suitable interface for networking, such as an Ethernet connection, and use any network communication protocol, such as the TCP/IP or HTTP protocols.

A program of instruction 162 is stored in the memory 130. The program of instruction 162 comprises instructions executable by the processor 120 to create a parsing instance 164 for parsing XML datasets. The parsing instance may be stored in memory 160 or in RAM 130. Parsing instance 164 parses XML datasets using stream parsing—that is, parsing XML infosets serially. In a sample embodiment, the program of instructions provides a set of match point tuples 166, which are an artifact of the program of instructions 162 that are used to identify data of interest. The parser instance 164 identifies data meeting the match point tuples 166 and builds one or more DOM instances 168 using the matched data.

The DOM instances 168 include only the XML data that satisfies the match point tuples 166. That is, the statements and data below the match point. According to a sample embodiment, the match point tuples 166 may comprise a match point identifying the location within an XML document for a node containing the data of interest, using a navigation tool such as XPath, for example. The match point tuple 166 may further comprise one or more filter criteria to select specific data within the desired node. Thus, the DOM instances 168 may be limited by one or more filters provided in the match point tuple 166 that define parameters for desired data within the matched node or nodes. Thus, a developer may parse a large XML document and create a DOM instance 168 comprising only the data that the developer desires. This allows for a smaller memory and processing footprint while providing desirable navigational flexibility.

The DOM instances 168 may be navigated in any direction. A developer may start at any point (i.e., at any statement) in the DOM instance 168. The developer may then navigate to a higher node, to a lower node, or to any other point in the DOM instance 168.

Figure 2:
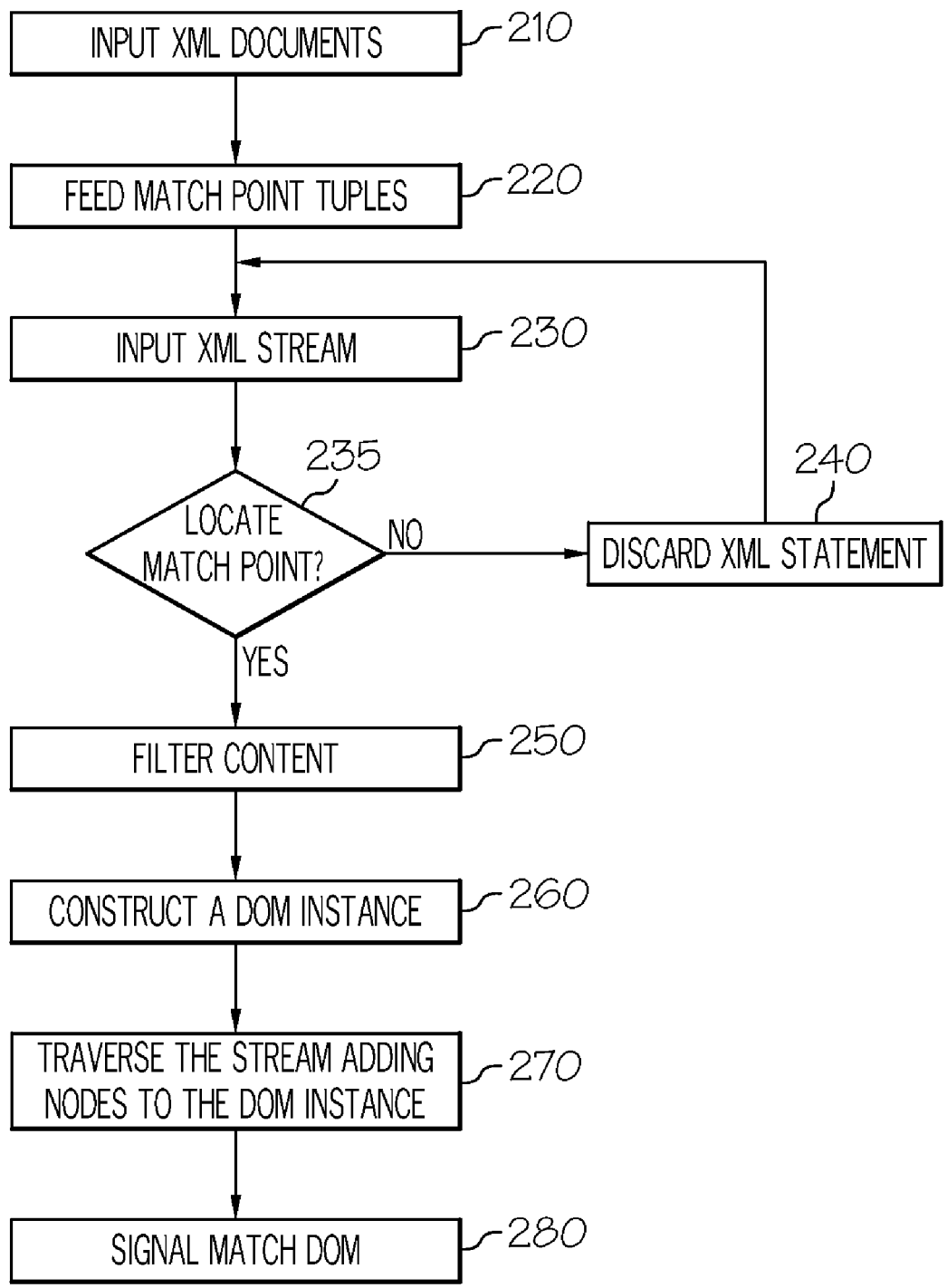
FIG. 2 is a flow diagram of a method for stream-based parsing of XML content with DOM instances according to a sample embodiment of the present invention.

An exemplary method for stream-based parsing of XML content with DOM instances according to a sample embodiment of the present invention is illustrated in FIG. 2. One or more XML documents are input to the parsing instance 164 (step 210). An application configured to use data from an XML document, such as the program of instruction 162, may input the XML stream to the parser instance 164 as a function of the application. For example, the parser instance may pull the XML document as a stream of bytes of information. The XML document may be stored in memory, on a network, or the like. The parser instance 164 continues to read the XML stream as the application code processes it.

A match point is fed to the parser instance 164 by a program of instruction 162 (step 220). In a sample embodiment, the match point is in the form of match point tuples 166, which may be XPath expressions or any other suitable identifier for XML data which a programmer wishes to include in a constructed DOM instance 168. For example, the match point tuple 166 may be of the form <XPath to match point>. The match point identifies the location or address within an XML document that a desired node of data may be found.

The parser instance 164 receives the match point tuple 166. The match point tuple 166 may be provided by an application, such as the program of instruction 162 as described above. Alternatively, the match point tuple 166 may be provided directly by a software developer, or by any other suitable means. The match point tuple 166 may comprise a match point definition expression or expressions. These may be in the form of XPath expressions or any other suitable definitional syntax.

The match point tuple 166 may further comprise a filter for selectively including only specific data. The filter may provide one or more attributes that define which data in the identified node should be included in the constructed DOM instance 168. For example, a match point tuple 166 with a filter may take the form (<XPath to match point>, <XPath to filter matched area>). The second statement, in this example the filter, must be lower than the match point. That is, the XPath for the filter is to a lower level node than the XPath for the match point. Alternatively, the filter may be relative. It should be understood that the match point may comprise one or more statements. Moreover, multiple filter statements may be used to filter the content of the XML stream.

In response to receiving the XML document input and the match point tuple 166 from the program of instruction 162, the parser instance 164 reads the XML stream (step 230). In a sample embodiment, the parser instance 164 begins parsing the XML document using stream-based parsing. Thus, each node of the XML document is parsed at it is encountered in the XML stream. The parser instance 164, in this embodiment, reads the XML stream from top to bottom. Parsed data may be discarded and garbage collected as it is read, thereby maintaining a small memory footprint. There is no need to save the entire XML stream, because data that matches the match point and passes the filter of the match point tuple 166 is included in the DOM instance 168, which may be freely navigated.

As the parser instance 164 reads the XML stream, it compares each statement in the XML stream to the match point in the match point tuple 166 to locate a matching node (step 235). In a sample embodiment, the XPath for each node of the XML stream is compared to the match point XPath in the match point tuple 166. If the node matches the match point, the data in that node is collected. If a statement in the XML stream does not match the match point of the match point tuple 166, then the statement is discarded after it is read (step 240). Thus, the memory requirements are less than for a traditional DOM based parser.

If a statement in the XML stream does match the match point of the match point tuple 166, then the node rooted at the matching statement is retained to be added to a DOM instance 168, which is constructed by the parser instance 164. The root may be identified by an XPath expression, for example. The XPath expression for the root (the top level statement from which the rest of the node branches) is used as the match point in the match point tuple 166. The data in the XML stream is compared with the XPath expression used as a match point in the match point tuple 166. For each statement in the XML stream that matches the XPath expression used as a match point in the match point tuple 166, the matching statement together with each lower level statement comprise a node in the tree structure of the XML document. This node, which is said to be rooted at the matching statement, is added to the DOM instance 168.

According to a sample embodiment, the match point tuple 166 passed by the program of instruction 162 to the parser instance 164 in step 220, in addition to the match point, also includes one or more filters. The filter may be an XPath expression containing attributes for desired data or any other suitable means for identifying desired data. The parser instance 164 filters the XML data using the filter in the match point tuple 166 (step 250). Data that matches the attributes identified in the filter statements is collected, while data that does not meet the filter statements is discarded.

In the illustrated exemplary embodiment, the parser instance 164 constructs a DOM instance 168 (step 260). The DOM instance 168 may be constructed, for example, by saving the XML data that matches the match point tuple 166, that is the match point expressions and filters. The matching data may be saved to any suitable memory, such as memory 160, for example. According to a sample embodiment, the parser instance 164 constructs the DOM instance by saving XML data from the XML stream using the match point statement as the DOM root. The statement that matches the match point from the match point tuple 166 and passes any filters in the match point tuple 166 becomes the DOM instance 168 root.

The parser instance 164 continues to read the stream of XML data, adding nodes to the DOM instance 168 (step 270). The added nodes comprise nodes rooted at statements that match the match point of the match point tuple 166. Moreover, if a filter is included in the match point tuple 166, only data that passes the filter (e.g., has the filter attribute) is added to the DOM instance 168. Alternatively, for a document that a programmer knows contains only one statement that matches the match point, the parser instance 164 may be configured to stop stream parsing after the DOM instance 168 is constructed, thereby eliminating superfluous parsing activity.

According to a sample embodiment, the parser instance 164 detects a match end point. The end point match is an end statement that matches the match point of the match point tuple 166. The parser 164 may detect the end point by testing each end point as the XML stream is read against the match point statement in the match point tuple 166, for example. That is, the XPath expression defines a region of the document. As the parser instance 164 parses the XML stream containing the data in the document, the parser determines whether or not the data in the XML stream is still in the defined region (e.g., in a node rooted at an XML statement matching the match point).

If the parser instance 164 detects a matched end point, then the parser instance 164 signals an application, such as the program of instruction 162, for example, with the constructed DOM instance 168 (step 280). The application 162 receives the match DOM instance 168. The parser instance 164 may signal an application using a push parsing model or using a pull parsing model. In the push parsing model, the parser sends the DOM instance 168 to an application 162. A 'listener pattern' may be programmatically implemented to register a callback to let the parser push the DOM 168 to the application. In the pull parsing model, an application code may be waiting on a blocking call to the parser to get more data, for example. The DOM instances 168, may then be pulled as they are needed by the application 162.

If the parser instance 164 does not detect a matched end point, then the parser instance 164 continues to read the stream adding nodes to the DOM instance 168 (step 270). The aforementioned process of locating nodes that match the match point and filtering the contents may be repeated for additional match point tuples, resulting in the construction of additional DOM instances.

An exemplary XML document 300 is illustrated in FIG. 3, two employee's node 310, 320 are illustrated. The first employee node 310 having the /Employee XML tag (statement 310A) and the second employee node 320 ending having the /Employee XML tag (statement 320A). The illustrated exemplary XML document may be an employee listing. Under each employee node 310, 320 there are name nodes 311, 321 comprising a name statement including name data; employee identification nodes 312, 321 comprising EID statements with EID numbers; and address nodes 313, 323. The address nodes 313, 323 comprise: location nodes 314, 324; street nodes 315, 325; and phone nodes 316, 326. The phone nodes 316, 326 include office phone nodes 317, 327 with office phone number data; residential phone nodes 318, 328 with residential phone number data; and mobile phone nodes 319, 329 with mobile phone number data.

A developer in a sample embodiment wants to parse the XML document 300 of FIG. 3. The developer wants to capture residential phone numbers for each employee in a new XML document, such as for programming an automatic dialer. Moreover, the developer wants to have the ability to navigate and change the new XML document. The developer initiates a program of instruction 162 that stream parses an XML stream and constructs a DOM instance 168.

The developer calls the program of instruction 162 to construct a parser instance 164. Then the developer provides a match point tuple 166 of (/Employee/Address/Phone, /*[local-name( )='Resi']). In this example, the match point is /Employee/Address/Phone and a filter for residential (i.e., 'Resi') is also provided. The program of instruction 162 passes this match point tuple 166 to a parser instance 164.

The parser instance 164 reads the XML stream of XML document 300 using stream-based parsing. The parser instance 164 compares each XML statement to the match point of the match point tuple 166. When the parser instance 164 reads the first matching statement 416 having an XPath of Employee/Address/Phone, the parser instance constructs a DOM instance 168 having Employee/Address/Phone as its root.

Within the newly constructed DOM instance 168, the parser filters XML data using the filter /*[local-name( )='Resi']. Thus, only the residential number 318 is added to the DOM instance. The direct office and mobile phone numbers are filtered out. The resulting DOM instance snippet 400 is shown in FIG. 4 comprising the root <phone> 311 and the statement <resi>356</resi> 312, containing the residential phone number of the first employee.

Similarly, the parser instance creates a root at the <phone> statement 326 also having an XPath Employee/Address/Phone. As the statement <Resi>222</Resi> is the only statement under the new root 326 that passes the filer, this newly constructed DOM instance snippet 500, as shown in FIG. 5, comprises the root <phone> and the statement <Resi>222</Resi>. The DOM instance snippets 400, 500 may be combined to form a new DOM instance.

Embodiments of the invention can take the form of an entirely hardware embodiment, an entirely software embodiment or an embodiment containing both hardware and software elements. In a sample embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain, store, communicate, propagate, or transport the program for use by or in connection with the instruction execution system, apparatus, or device.

The foregoing method may be realized by a program product comprising a machine readable media having a machine-executable program of instructions, which when executed by a machine, such as a computer, performs the steps of the method. This program product may be stored on any of a variety of known machine-readable media, including but not limited to compact discs, floppy discs, USB memory devices, and the like. Moreover, the program product may be in the form of a machine readable transmission such as blue ray, HTML, XML, or the like.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method of parsing a document, the method comprising:
   constructing a parser instance that is configured to:
      stream parse a plurality of XML documents as an XML stream, wherein each of the plurality of XML documents include one or more nodes, wherein each node within the plurality of XML documents is parsed as it is encountered in the XML stream;
      during the stream parsing, detect XML match statements within the plurality of XML documents of the XML stream that match a match point, wherein the match point identifies a location or address within the plurality of XML documents that a desired node of data may be found;
      in response to detecting at least one XML match statement in the XML stream that matches the match point, construct a document object model (DOM) instance, wherein the DOM instance includes:
         the at least one XML match statement in the XML stream that matches the match point; and
         a XML content within a node that corresponds to the at least one XML match statement;
      in response to detecting one or more statements in the XML stream that do not match the match point, discard the one or more statements in the XML stream that do not match the match point, wherein the one or more statements in the XML stream that do not match the match point are discarded and garbage collected as they are read;
   inputting the XML stream to the parser instance;
   passing the match point to the parser instance; and
   receiving, from the parser instance, the DOM instance.

2. The method of claim 1, wherein the match point comprises an XPath expression and wherein the parser instance detects the XML match statements that match the match point without converting the XML stream into a subset of information.

3. The method of claim 1, wherein:
   the match point is passed in a match point tuple;
   the match point comprises more than one statement;
   the match point tuple further comprises a filter; and
   the XML content is XML content that passes the filter.

4. The method of claim 1, wherein the DOM instance is pulled by an application.

5. The method of claim 1, wherein the parser instance pushes the DOM instance to the application.

6. A method of parsing an XML document by a computer, the method comprising:
   receiving, at a parser instance:
      an XML stream comprising a plurality of XML documents, wherein each of the plurality of XML documents include one or more nodes; and
      a match point, wherein a match point identifies a location or address within the plurality of XML documents that a desired node of data may be found;
   the parser instance stream parsing the XML stream, wherein each node within the plurality of XML documents is parsed as it is encountered in the XML stream;
   during the stream parsing, detecting XML match statements within the plurality of XML documents of the XML stream that match the match point;
   in response to detecting at least one XML match statement in the XML stream that matches the match point, the parser instance constructing a document object model (DOM) instance including:
      the at least one XML match statement that matches the match point; and
      a XML content within a node corresponding to the at least one XML match statement in the XML stream; and
   in response to detecting one or more statements in the XML stream that do not match the match point, discarding the one or more statements in the XML stream that do not match the match point, wherein the one or more statements in the XML stream that do not match the match point are discarded and garbage collected as they are read.

7. The method of claim 6, wherein the match point comprises an XPath expression and wherein the detecting comprises detecting the XML match statements that match the match point, without converting the XML stream into a subset of information.

8. The methods of claim 6, wherein:
the match point is passed in a match point tuple;
the match point comprises more than one statement;
the match point tuple further comprises a filter; and
the XML content is XML content that passes the filter.

9. The method of claim 6, further comprising:
in response to constructing the DOM instance,
continuing to stream parse the XML stream; and
in response to detecting a second match statement in the XML stream that contains an XML content matching the match point, adding the detected second match statement and XML content within a node corresponding to the second match statement in the XML stream to the DOM instance.

10. The method of claim 6, further comprising in response to constructing the DOM instance, stopping the stream parsing.

11. An apparatus for parsing a document, comprising:
a processor;
a memory interconnected with the processor; and
a parser instance stored on the memory the parser instance executable by the processor, the parser instance configured to:
receive an XML stream comprising a plurality of XML documents, wherein each of the plurality of XML documents include one or more nodes;
receive a match point, wherein the match point identifies a location or address within the plurality of XML documents that a desired node of data may be found and wherein the match point comprises more than one statement;
stream parse the XML stream, wherein each node within the plurality of XML documents is parsed as it is encountered in the XML stream;
during the stream parsing, detect XML match statements within the plurality of XML documents of the XML stream that match the match point;
in response to detecting at least one XML match statement in the XML stream that matches the match point, construct a document object model (DOM) instance including:
the at least one XML match statement that matches the match point; and
a XML content within a node corresponding to the at least one XML match statement in the XML stream;
in response to an end statement matching the match point, signal an application with the DOM instance; and
in response to detecting one or more statements in the XML stream that do not match the match point, discard the one or more statements in the XML stream that do not match the match point, wherein the one or more statements in the XML stream that do not match the match point are discarded and garbage collected as they are read.

12. An apparatus for parsing a document, comprising:
a processor; and
a memory interconnected with the processor having stored thereon a program of instructions executable by the processor to:
construct a parser instance that is configured to:
receive an XML stream comprising a plurality of XML documents, wherein each of the plurality of XML documents include one or more nodes;
receive a match point, wherein the match point identifies a location or address within the plurality of XML documents that a desired node of data may be found;
stream parse the XML stream, wherein each node within the plurality of XML documents is parsed as it is encountered in the XML stream;
during the stream parsing, detect XML match statements within the plurality of XML documents of the XML stream that match the match point;
in response to detecting at least one XML match statement in the XML stream that matches the match point, construct a document object model (DOM) instance including:
the at least one XML match statement that matches the match point; and
a XML content within a node corresponding to the at least one XML match statement in the XML stream;
in response to an end statement matching the match point, signal the program of instruction with the DOM instance; and
in response to detecting one or more statements in the XML stream that do not match the match point, discard the one or more statements in the XML stream that do not match the match point, wherein the one or more statements in the XML stream that do not match the match point are discarded and garbage collected as they are read.

13. The apparatus of claim 12, wherein the program of instructions is configured to pass the match point to the parser instance.

14. The apparatus of claim 12, wherein the match point comprises an XPath expression and wherein the parser instance detects the XML match statements that match the match point, without converting the XML stream into a subset of information.

15. The apparatus of claim 12, wherein:
the program of instructions is further configured to pass the match point and a filter in a match point tuple;
the match point comprises more than one statement; and
the XML content is XML content that passes the filter.

16. The apparatus of claim 12, wherein the program of instructions is configured to pull the DOM instance.

17. The apparatus of claim 12, wherein the parser instance is further configured to push the DOM instance to the application.

18. A program product comprising a computer readable device having stored thereon computer executable instructions for:
constructing a parser instance that is configured to:
stream parse a plurality of XML documents as an XML stream, wherein each of the plurality of XML documents include one or more nodes, wherein each node within the plurality of XML documents is parsed as it is encountered in the XML stream;
during the stream parsing, detect XML match statements within the plurality of XML documents of the XML stream that match a match point, wherein the match point identifies a location or address within the plurality of XML documents that a desired node of data may be found;

in response to detecting an XML match statement in an XML stream that matches a match point, construct a document object model (DOM) instance, wherein the DOM instance includes:
   the XML match statement in the XML stream that matches the match point; and
   a XML content within a node that corresponds to the XML match statement;
in response to detecting one or more statements in the XML stream that do not match the match point, discard the one or more statements in the XML stream that do not match the match point, wherein the one or more statements in the XML stream that do not match the match point are discarded and garbage collected as they are read;
inputting the XML stream to the parser instance;
passing the match point to the parser instance; and
receiving, from the parser instance, the DOM instance.

19. The program product of claim 18, the computer executable instructions further comprising instructions for:
receiving, at the parser instance, a match point tuple comprising the match point, wherein the match point comprises more than one statement;
in response to detecting at least one XML match statement within the plurality of XML documents of the XML stream that match the match point tuple:
   constructing a DOM instance including:
      the at least one XML match statement that matches the match point in the match point tuple; and
      an XML content within a node corresponding to the at least one XML match statement in the XML stream; and
   signaling an application with the DOM instance;
wherein the parser instance detects the XML match statements that match the match point without converting the XML stream into a subset of information.

20. The program product of claim of claim 18, the computer executable instructions further comprising instructions for pulling the DOM instance.

21. The program product of claim of claim 20, wherein the parser instance pushes the DOM instance to the program of instruction.

* * * * *